(12) United States Patent
Toda et al.

(10) Patent No.: US 11,208,705 B2
(45) Date of Patent: Dec. 28, 2021

(54) HIGH-STRENGTH COLD-ROLLED STEEL SHEET

(71) Applicant: NIPPON STEEL CORPORATION, Tokyo (JP)

(72) Inventors: Yuri Toda, Tokyo (JP); Kunio Hayashi, Tokyo (JP); Katsuya Nakano, Tokyo (JP); Eisaku Sakurada, Tokyo (JP); Akihiro Uenishi, Tokyo (JP); Kengo Takeda, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 16/759,678

(22) PCT Filed: Nov. 15, 2017

(86) PCT No.: PCT/JP2017/041058
§ 371 (c)(1),
(2) Date: Apr. 27, 2020

(87) PCT Pub. No.: WO2019/097600
PCT Pub. Date: May 23, 2019

(65) Prior Publication Data
US 2020/0283869 A1      Sep. 10, 2020

(51) Int. Cl.
| | |
|---|---|
| *B32B 15/01* | (2006.01) |
| *C22C 38/00* | (2006.01) |
| *C22C 38/02* | (2006.01) |
| *C22C 38/06* | (2006.01) |
| *C22C 38/20* | (2006.01) |
| *C22C 38/44* | (2006.01) |
| *C22C 38/46* | (2006.01) |
| *C22C 38/48* | (2006.01) |
| *C22C 38/50* | (2006.01) |
| *C22C 38/54* | (2006.01) |
| *C22C 38/58* | (2006.01) |
| *C21D 6/00* | (2006.01) |
| *C21D 8/02* | (2006.01) |
| *C23C 2/06* | (2006.01) |
| *C23C 2/40* | (2006.01) |
| *C21D 9/46* | (2006.01) |

(52) U.S. Cl.
CPC .............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/02* (2013.01); *C22C 38/06* (2013.01); *C22C 38/20* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/06* (2013.01); *C23C 2/40* (2013.01); *C21D 2211/001* (2013.01); *C21D 2211/002* (2013.01); *C21D 2211/005* (2013.01); *C21D 2211/008* (2013.01)

(58) Field of Classification Search
CPC ... C22C 38/001; C22C 38/002; C22C 38/005; C22C 38/02; C22C 38/06; C22C 38/20; C22C 38/44; C22C 38/46; C22C 38/48; C22C 38/50; C22C 38/54; C22C 38/58; C21D 2211/001; C21D 2211/002; C21D 2211/005; C21D 2211/008
USPC ......................................................... 428/659
See application file for complete search history.

(56) References Cited

U.S. PATENT DOCUMENTS

| | | | |
|---|---|---|---|
| 10,407,760 B2 | 9/2019 | Azuma et al. | |
| 10,544,475 B2 | 1/2020 | Suwa et al. | |
| 2002/0043305 A1 | 4/2002 | Fairchild et al. | |
| 2008/0000555 A1 | 1/2008 | Nonaka et al. | |
| 2008/0251161 A1 | 10/2008 | Kashima et al. | |
| 2011/0036465 A1 | 2/2011 | Kawasaki et al. | |
| 2011/0139315 A1 | 6/2011 | Nakagaito et al. | |
| 2011/0146852 A1 | 6/2011 | Matsuda et al. | |

(Continued)

FOREIGN PATENT DOCUMENTS

| | | |
|---|---|---|
| CN | 104630620 A | 5/2015 |
| JP | 7-207413 A | 8/1995 |

(Continued)

OTHER PUBLICATIONS

"Metallic materials-Hole expanding test", JIS Z 2256 (2010), total of 21 pages.

(Continued)

*Primary Examiner* — Humera N. Sheikh
*Assistant Examiner* — Katherine A Christy
(74) *Attorney, Agent, or Firm* — Birch, Stewart, Kolasch & Birch, LLP

(57) ABSTRACT

A high-strength cold-rolled steel sheet which is a steel sheet having a tensile strength of 980 MPa or more has a predetermined chemical component composition, a metallographic microstructure of the steel sheet contains, by area ratio, ferrite and granular bainite: 10% or more and 50% or less in total, one or both of upper bainite and lower bainite: 10% or more and 50% or less in total, tempered martensite: more than 0% and 30% or less, retained austenite: 5% or more, and one or more of pearlite, cementite, and martensite: 0% to 10% in total, and an area ratio of the ferrite with respect to a total area ratio of the ferrite and the granular bainite is 25% or less.

12 Claims, No Drawings

(56) References Cited

U.S. PATENT DOCUMENTS

| | | |
|---|---|---|
| 2011/0162762 A1 | 7/2011 | Matsuda et al. |
| 2011/0186189 A1 | 8/2011 | Futamura |
| 2013/0167980 A1 | 7/2013 | Kawata et al. |
| 2014/0242416 A1 | 8/2014 | Matsuda et al. |
| 2015/0299834 A1 | 10/2015 | Mizuta et al. |
| 2017/0349967 A1 | 12/2017 | Yokoi et al. |
| 2018/0023155 A1 | 1/2018 | Takeda et al. |
| 2019/0003009 A1* | 1/2019 | Kawata .................. C22C 38/42 |
| 2019/0040482 A1 | 2/2019 | Kimata et al. |

FOREIGN PATENT DOCUMENTS

| | | |
|---|---|---|
| JP | 2616350 B2 | 6/1997 |
| JP | 2004-190050 A | 7/2004 |
| JP | 2004-211126 A | 7/2004 |
| JP | 2006-104532 A | 4/2006 |
| JP | 2006-274417 A | 10/2006 |
| JP | 2009-203548 A | 9/2009 |
| JP | 2009-209451 A | 9/2009 |
| JP | 2010-65273 A | 3/2010 |
| JP | 2010-90475 A | 4/2010 |
| JP | 2014-133944 A | 7/2014 |
| JP | 5589893 B2 | 9/2014 |
| JP | 2015-113504 A | 6/2015 |
| TW | 201319268 A1 | 5/2013 |
| TW | 201443249 A | 11/2014 |
| WO | WO 2012/036269 A1 | 3/2012 |
| WO | WO 2013/051238 A1 | 4/2013 |
| WO | WO 2016/132542 A1 | 8/2016 |
| WO | WO 2016/136810 A1 | 9/2016 |
| WO | WO 2017/138503 A1 | 8/2017 |
| WO | WO 2017/164346 A1 | 9/2017 |

OTHER PUBLICATIONS

"Method for Charpy pendulum impact test of metallic materials", JIS Z 2242 (2005), total of 26 pages.

International Search Report for PCT/JP2016/076129 (PCT/ISA/210) dated Oct. 4, 2016.

International Search Report for PCT/JP2017/041058 (PCT/ISA/210) dated Feb. 20, 2018.

Office Action issued in TW Application No. 105128729 dated Apr. 5, 2017.

Written Opinion of the International Searching Authority for PCT/JP2017/041058 (PCT/ISA/210) dated Feb. 20, 2018.

* cited by examiner

HIGH-STRENGTH COLD-ROLLED STEEL SHEET

TECHNICAL FIELD OF THE INVENTION

The present invention relates to a high-strength cold-rolled steel sheet.

RELATED ART

In recent years, reducing the weight of a vehicle body by application of a high-strength steel sheet has progressed in order to suppress a discharge amount of carbon dioxide from a vehicle. Furthermore, a high-strength steel sheet has been frequently used for a vehicle body in order to secure the safety of occupants. In order to further reduce the weight of a vehicle body and to improve safety, it is necessary to increase the strength level of a steel sheet to be used more than before.

A steel sheet to be formed into a member for a vehicle is required to have formability (workability) in addition to strength. For example, a steel sheet which is used for a skeletal component is required to have sufficient elongation and hole expansibility. However, in general, in a case where the strength of a steel sheet is increased, the formability decreases. Therefore, in a case where the strength of a steel sheet to be applied to a member for a vehicle is increased, it is desirable to improve the formability.

Several methods have been proposed in order to achieve this. For example, Patent Document 1 discloses a high-strength thin steel sheet in which the carbon concentration gradient in the grains and in the vicinity of the interface in retained austenite is specified, and the strength and the elongation are improved by strain-induced transformation. Patent Document 2 discloses a cold-rolled steel sheet in which the metallographic microstructure of the steel sheet is based mainly on upper bainite or lower bainite having intermediate hardness between ferrite and martensite to reduce the hardness difference between the structures and to improve the strength and the hole expansibility. Patent Document 3 discloses a cold-rolled steel sheet with a composite microstructure in which the metallographic microstructure of the steel sheet is composed of three phases of ferrite, upper bainite or lower bainite, and retained austenite, or four phases further including martensite such that high workability is obtained with a strength level of 45 to 65 kgf/mm$^2$.

However, these techniques have the following problems. That is, in order to manufacture the steel sheet of Patent Document 1, it is necessary to control the carbon concentration gradient in the retained austenite by controlling the cooling rate after overaging that is usually difficult to control. Therefore, it is not easy to realize the structure disclosed in Patent Document 1 using normal equipment. In addition, in the technique of Patent Document 2, since the structure mainly includes bainite, excellent hole expansibility is obtained, but it is difficult to obtain sufficient ductility. In addition, Patent Document 3 is intended to provide a steel sheet having a tensile strength of 45 to 65 kgf/mm$^2$, and in the technique of Patent Document 3, it is difficult to achieve both a tensile strength of 980 MPa or more and sufficient formability.

PRIOR ART DOCUMENT

Patent Document

[Patent Document 1] Japanese Patent No. 5589893
[Patent Document 2] Japanese Patent No. 2616350
[Patent Document 3] Japanese Unexamined Patent Application, First Publication No. H7-207413

DISCLOSURE OF THE INVENTION

Problems to be Solved by the Invention

As described above, in order to reduce the weight of a vehicle body, it is necessary to increase the use strength level of a steel sheet more than before. Particularly, for example, in order to use a high-strength steel sheet for a skeletal component, it is necessary to improve hole expansibility without deteriorating the elongation. Specifically, in order to allow the formation into a skeletal component and to secure safety at the time of collision, the steel sheet preferably satisfies all of a tensile strength of 980 MPa or more, strength×total elongation (TS×EL) of 12,000 MPa·% or more, and strength×hole expansibility (TS×λ) of 18,000 MPa·% or more. However, as shown in Patent Documents 1 to 3, it is extremely difficult to have all of the strength, elongation, and hole expansibility at such a high level in the high-strength steel sheet. Accordingly, in view of the current status of the related art, an object of the present invention is to provide a high-strength cold-rolled steel sheet having a tensile strength of 980 MPa or more and which is excellent in elongation and hole expansibility.

Means for Solving the Problem

The inventors have intensively studied a method for solving the above-described problems. As a result, they have newly found that in a steel sheet having a tensile strength of 980 MPa or more, in a case where the metallographic microstructure includes ferrite and/or granular bainite, upper bainite and/or lower bainite, tempered martensite, and retained austenite, and an area ratio of the ferrite with respect to a total area ratio of the ferrite and the granular bainite is controlled to 25% or less, it is possible to obtain excellent hole expansibility while securing strength and elongation.

The present invention has been made based on the above findings, and the gist thereof is as follows.

(1) A high-strength cold-rolled steel sheet according to an aspect of the present invention containing, as a chemical composition, by mass %: C: 0.15% or more and 0.30% or less; P: 0.040% or less; S: 0.0100% or less; N: 0.0100% or less; O: 0.0060% or less; one or both of Si and Al: 0.70% or more and 2.50% or less in total; one or both of Mn and Cr: 1.50% or more and 3.50% or less in total; Mo: 0% or more and 1.00% or less; Ni: 0% or more and 1.00% or less; Cu: 0% or more and 1.00% or less; Nb: 0% or more and 0.30% or less; Ti: 0% or more and 0.30% or less; V: 0% or more and 0.30% or less; B: 0% or more and 0.0050% or less; Ca: 0% or more and 0.0400% or less; Mg: 0% or more and 0.0400% or less; REM: 0% or more and 0.0400% or less; and a remainder consisting of Fe and impurities, in which a metallographic microstructure of the steel sheet contains, by area ratio, one or both of ferrite and granular bainite: 10% or more and 50% or less in total, one or both of upper bainite and lower bainite: 10% or more and 50% or less in total, tempered martensite: more than 0% and 30% or less, retained austenite: 5% or more, and one or more of pearlite, cementite, and martensite: 0% to 10% in total, an area ratio of the ferrite with respect to a total area ratio of the ferrite and the granular bainite is 25% or less, and the steel sheet has a tensile strength of 980 MPa or more.

(2) In the high-strength cold-rolled steel sheet according to (1), the martensite may be contained in an amount of 3% or less by area ratio in the metallographic microstructure.

(3) In the high-strength cold-rolled steel sheet according to (1) or (2), the chemical composition may contain, by mass %, one or more selected from Mo: 0.01% or more and 1.00% or less, Ni: 0.05% or more and 1.00% or less, Cu: 0.05% or more and 1.00% or less, Nb: 0.005% or more and 0.30% or less, Ti: 0.005% or more and 0.30% or less, V: 0.005% or more and 0.30% or less, B: 0.0001% or more and 0.0050% or less, Ca: 0.0005% or more and 0.0400% or less, Mg: 0.0005% or more and 0.0400% or less, and REM: 0.0005% or more and 0.0400% or less.

(4) The high-strength cold-rolled steel sheet according to any one of (1) to (3), wherein a hot-dip galvanized layer may be formed on a surface of the steel sheet.

(5) The high-strength cold-rolled steel sheet according to any one of (1) to (3), wherein an alloyed hot-dip galvannealed layer may be formed on a surface of the steel sheet.

Effects of the Invention

According to the aspect of the present invention, it is possible to provide a high-strength cold-rolled steel sheet which is suitable as a structural member of a vehicle or the like, is excellent in elongation and hole expansibility, and has a tensile strength of 980 MPa or more.

EMBODIMENTS OF THE INVENTION

A high-strength cold-rolled steel sheet according to an embodiment of the present invention (hereinafter, may be referred to as a cold-rolled steel sheet according to this embodiment) has the following characteristics.

(a) The chemical composition contains, by mass %, C: 0.15% or more and 0.30% or less, P: 0.040% or less, S: 0.0100% or less, N: 0.0100% or less, O: 0.0060% or less, Si and Al: 0.70% or more and 2.50% or less in total, and Mn and Cr: 1.50% or more and 3.50% or less in total, and optionally, further contains one or more of Mo: 1.00% or less, Ni: 1.00% or less, Cu: 1.00% or less, Nb: 0.30% or less, Ti: 0.30% or less, V: 0.30% or less, B: 0.0050% or less, Ca: 0.0400% or less, Mg: 0.0400% or less, and REM: 0.0400% or less, with a remainder of Fe and impurities.

(b) The metallographic microstructure contains, by area ratio, 10% or more and 50% or less of one or both of ferrite and granular bainite in total, 10% or more and 50% or less of one or both of upper bainite and lower bainite in total, more than 0% and 30% or less of tempered martensite, 5% or more of retained austenite, and 0% to 10% of one or more of pearlite, cementite, and martensite in total, and an area ratio of the ferrite with respect to a total area ratio of the ferrite and the granular bainite is 25% or less.

(c) The tensile strength is 980 MPa or more.

The chemical composition (content of each element) of the cold-rolled steel sheet according to this embodiment will be described. The symbol % relating to the content means mass %.

<C: 0.15% or more and 0.30% or less>

C is an effective element for improving the strength of the steel sheet. In addition, C is an element necessary for securing a predetermined amount of retained austenite. In a case where the C content is less than 0.15%, the austenite is transformed into martensite, and 5% or more of the retained austenite cannot be secured. Therefore, the C content is set to 0.15% or more. The C content is preferably 0.18% or more.

In a case where the C content is more than 0.30%, the phase transformation from austenite to upper bainite or lower bainite is significantly suppressed, and martensite is easily formed. As a result, 5% or more of the retained austenite cannot be secured. Therefore, the C content is set to 0.30% or less. The C content is preferably 0.25% or less, and more preferably 0.22% or less.

<P: 0.040% or less>

P is an impurity element. P is an element which segregates in a sheet thickness central portion of the steel sheet, thereby deteriorating toughness or embrittling the weld. The smaller the P content, the more preferable. However, in a case where the P content is more than 0.040%, the hole expansibility significantly deteriorates. Therefore, the P content is set to 0.040% or less. The P content is preferably 0.015% or less. Since the smaller the P content, the more preferable, it is not necessary to limit the lower limit. However, since it is economically disadvantageous to make the P content less than 0.0001% in a practical steel sheet, the lower limit may be substantially 0.0001%.

<S: 0.0100% or less>

S is an impurity element. S is an element which deteriorates weldability or impairs manufacturability during casting and hot rolling. In addition, S is an element which forms coarse MnS in the steel sheet and deteriorates hole expansibility. The smaller the S content, the more preferable. However, in a case where the S content is more than 0.0100%, the weldability, the manufacturability, and the hole expansibility are significantly deteriorated. Therefore, the S content is set to 0.0100% or less. The S content is preferably 0.0050% or less. Since the smaller the S content, the more preferable, it is not necessary to limit the lower limit. However, since it is economically disadvantageous to make the S content less than 0.0001% in a practical steel sheet, the lower limit may be substantially 0.0001%.

<N: 0.0100% or less>

N is an element which forms a coarse nitride in the steel sheet and deteriorates the bendability and the hole expansibility of the steel sheet. In addition, N is an element which causes blowholes during welding. The smaller the N content, the more preferable. However, in a case where the N content is more than 0.0100%, a reduction in hole expansibility or the generation of blowholes is significantly exhibited. Therefore, the N content is set to 0.0100% or less. Since the smaller the N content, the more preferable, it is not necessary to limit the lower limit. However, the manufacturing cost is significantly increased in a case where the N content is made less than 0.0005% in a practical steel sheet. Therefore, the lower limit may be substantially 0.0005%.

<O: 0.0060% or less>

O is an element which forms a coarse oxide in the steel sheet and deteriorates the bendability and hole expansibility of the steel sheet. In addition, O is an element which causes blowholes during welding. The smaller the O content, the more preferable. However, in a case where the O content is more than 0.0060%, a reduction in hole expansibility or the generation of blowholes is significantly exhibited. Therefore, the O content is set to 0.0060% or less. Since the smaller the O content, the more preferable, it is not necessary to limit the lower limit. However, the manufacturing cost is significantly increased in a case where the O content is made less than 0.0005% in a practical steel sheet. Therefore, the lower limit may be substantially 0.0005%.

<One or Both of Si and Al: 0.70% or More and 2.50% or Less in Total>

Both Si and Al are effective elements for obtaining a predetermined amount of granular bainite and retained austenite. Granular bainite is a metallographic microstructure in which dislocations present at the interface are recovered by a heat treatment and form a massive form in acicular bainitic ferrite. That is, the bainitic ferrite and the granular bainite are not the same.

Once cementite is formed at the interface of the bainitic ferrite, the granular bainite cannot be obtained. Since Si and Al are elements which suppress the formation of cementite, these are important elements for obtaining the granular bainite.

Furthermore, Si and Al are important elements for obtaining retained austenite. In a case where a part of austenite is transformed into bainite, carbon is concentrated in untransformed austenite, and the carbon concentration in the untransformed austenite is increased. Since the austenite becomes stable due to the concentration of carbon, the austenite in which the carbon is sufficiently concentrated remains without being transformed into another structure even after cooling to room temperature. Such austenite is retained austenite. In a case where cementite is precipitated in the stage of concentration of carbon in the untransformed austenite, the carbon concentration in the austenite decreases, and it is difficult to maintain untransformed austenite even at room temperature. That is, since Si and Al are elements which suppress the formation of cementite, these are important elements for obtaining the retained austenite.

As a result of intensive studies by the inventors, it has been found that a predetermined amount of granular bainite and retained austenite can be obtained by setting the sum of the contents of Si and/or Al to 0.70% or more. Therefore, the total content of Si and Al is set to 0.70% or more. In a case where the sum of the contents (total content) of Si and/or Al is excessive, the steel itself embrittles and the hole expansibility significantly deteriorates. Therefore, the sum of the contents of Si and/or Al is set to 2.50% or less. The sum of the contents of Si and/or Al is preferably less than 1.40%.

In the cold-rolled steel sheet according to this embodiment, since Si and Al have the same effects, the total content thereof may be specified, and it is not necessary to specify the content of each element. That is, in a case where the total content is within the above range, for example, one of Si and Al may be 0%.

<One or Both of Mn and Cr: 1.50% or More and 3.50% or Less in Total>

Both Mn and Cr are effective elements for improving the strength of the steel sheet. In addition, Mn and Cr are elements which suppress ferritic transformation during a heat treatment in continuous annealing process or continuous hot-dip galvanizing process. Suppressing the ferritic transformation during the heat treatment is advantageous to set the area ratio of ferrite to be 25% or less, that is, to set the area ratio of granular bainite to be 75% or more with respect to a total area ratio of the ferrite and the granular bainite. In order to obtain this effect, the sum of the contents of Mn and/or Cr is set to 1.50% or more. In a case where the sum of the contents of Mn and/or Cr is more than 3.50%, the phase transformation from austenite to upper bainite or lower bainite is significantly suppressed. In this case, as a result, 5% or more of retained austenite cannot be secured, and the area ratio of martensite is more than 10%. Therefore, the sum of the contents of Mn and/or Cr is set to 3.50% or less.

In the cold-rolled steel sheet according to this embodiment, since Mn and Cr have the same effects, the total content thereof may be specified, and it is not necessary to specify the content of each element. That is, in a case where the total content is within the above range, for example, one of Mn and Cr may be 0%.

The cold-rolled steel sheet according to this embodiment is based on the fact that the above elements are contained and the remainder is Fe and impurities. However, instead of a part of Fe, one or more selected from Mo, Ni, Cu, Nb, Ti, V, B, Ca, Mg, and REM may be optionally contained within a range to be described later. However, since these elements do not necessarily need to be contained, the lower limit is 0%. The impurities mean components which are mixed from raw materials such as ore or scrap or due to various factors of the manufacturing processes during industrial steel manufacturing, and are permitted within a range not adversely affecting the cold-rolled steel sheet according to this embodiment.

<Mo: 0% or more and 1.00% or less>

Mo is an effective element for improving the strength of the steel sheet. In addition, Mo is an element having an effect of suppressing ferritic transformation occurring during a heat treatment in continuous annealing process or continuous hot-dip galvanizing process. The Mo content is preferably set to 0.01% or more to obtain the above effects. In a case where the Mo content is more than 1.00%, the effect of suppressing ferritic transformation is saturated. Therefore, the Mo content is preferably set to 1.00% or less even in a case where Mo is contained.

<Ni: 0% or more and 1.00% or less>

Ni is an effective element for improving the strength of the steel sheet. In addition, Ni is an element having an effect of suppressing ferritic transformation occurring during a heat treatment in continuous annealing process or continuous hot-dip galvanizing process. The Ni content is preferably set to 0.05% or more to obtain the above effects. In a case where the Ni content is more than 1.00%, the effect of suppressing ferritic transformation is saturated. Therefore, the Ni content is preferably set to 1.00% or less even in a case where Ni is contained.

<Cu: 0% or more and 1.00% or less>

Cu is an effective element for improving the strength of the steel sheet. The Cu content is preferably set to 0.05% or more to obtain the above effect. In a case where the Cu content is excessive, the steel embrittles during hot rolling, and hot rolling cannot be performed. Therefore, the Cu content is preferably set to 1.00% or less even in a case where Cu is contained.

<Nb: 0% or more and 0.30% or less>

Nb is an effective element for reducing crystal grains in size and improving the strength of the steel sheet. In addition, Nb is an element having an effect of suppressing ferritic transformation occurring during a heat treatment in continuous annealing process or continuous hot-dip galvanizing process. The Nb content is preferably set to 0.005% or more to obtain the above effects. In a case where the Nb content is more than 0.30%, the phase transformation from austenite to upper bainite or lower bainite is significantly suppressed. As a result, martensite is excessively formed, and 5% or more of retained austenite cannot be secured. Therefore, the Nb content is preferably set to 0.30% or less even in a case where Nb is contained.

<Ti: 0% or more and 0.30% or less>

Ti is an effective element for improving the strength of the steel sheet. In addition, Ti is an element having an effect of suppressing ferritic transformation occurring during a heat treatment in continuous annealing process or continuous hot-dip galvanizing process. The Ti content is preferably set to 0.005% or more to obtain the above effects. In a case where the Ti content is more than 0.30%, the phase transformation from austenite to upper bainite or lower bainite is significantly suppressed. As a result, martensite is excessively formed, and 5% or more of retained austenite cannot be secured. Therefore, the Ti content is preferably set to 0.30% or less even in a case where Ti is contained.

<V: 0% or more and 0.30% or less>

V is an effective element for improving the strength of the steel sheet. In addition, V is an element having an effect of suppressing ferritic transformation occurring during a heat treatment in continuous annealing process or continuous hot-dip galvanizing process. The V content is preferably set to 0.005% or more to obtain the above effects. In a case where the V content is more than 0.30%, the phase transformation from austenite to upper bainite or lower bainite is significantly suppressed. As a result, martensite is excessively formed, and 5% or more of retained austenite cannot be secured. Therefore, the V content is preferably set to 0.30% or less even in a case where V is contained.

<B: 0% or more and 0.0050% or less>

B is an element which segregates at a grain boundary of austenite during a heat treatment process, thereby suppressing ferritic transformation. The B content is preferably set to 0.0001% or more to obtain the above effect. In a case where the B content is more than 0.0050%, the effect of suppressing ferritic transformation is saturated, and substantially, the upper limit is thus preferably 0.0050%.

<Ca: 0% or more and 0.0400% or less>
<Mg: 0% or more and 0.0400% or less>
<REM: 0% or more and 0.0400% or less>

All of Ca, Mg, and REM are elements which control the form of an oxide or a sulfide and contribute to the improvement of hole expansibility. The content of any of the elements is preferably set to 0.0005% or more to obtain the above effect. The content of any of the elements is more preferably 0.0010% or more. In a case where the content of Ca, Mg, or REM is more than 0.0400%, a coarse oxide is formed, and the hole expansibility deteriorates. Therefore, the content of any of the elements is set to 0.0400% or less. The content of any of the elements is more preferably 0.0100% or less.

In a case where a rare earth element (REM) is contained, misch metal is added in many cases, and in some cases, a lanthanoid series element other than La and Ce is added in combination. Even in such a case, and even in a case where a metal REM such as a metal La or Ce is added, the cold-rolled steel sheet according to this embodiment can exhibit the effects. In this embodiment, REM means 17 elements including Sc, Y, and lanthanoid, and the REM content is a total content of the elements.

Next, the metallographic microstructure of the cold-rolled steel sheet according to this embodiment will be described.

Based on the premise of using continuous hot rolling process and continuous annealing process which are usually employed at present, the inventors have studied to secure a strength and elongation and to improve hole expansibility in a steel sheet having a tensile strength of 980 MPa or more.

As described above, in order to improve the hole expansibility without deteriorating the strength and elongation in a steel sheet suitable as a structural member of a vehicle or the like, using ferrite as a metallographic microstructure of the steel sheet has been studied. However, since ferrite is a soft metallographic microstructure, the ferrite becomes a factor which increases the hardness difference between the structures in a high-strength steel sheet composed of a composite microstructure. As a result, a problem has occurred in that the hole expansibility deteriorates. Accordingly, the inventors have studied focusing on using granular bainite as a metallographic microstructure of the steel sheet. As a result, the inventors have successfully obtained excellent hole expansibility while securing strength and ductility by controlling a total area ratio of ferrite and granular bainite and an area ratio of the ferrite with respect to the total area ratio of the ferrite and the granular bainite.

The metallographic microstructure (microstructure) of the cold-rolled steel sheet according to this embodiment is limited based on the above knowledge. Hereinafter, detailed description thereof will be given.

<One Or Both Of Ferrite And Granular Bainite Is Contained In Amount Of 10% Or More And 50% Or Less In Total By Area Ratio>

<Area Ratio of Ferrite with Respect to Total Area Ratio of Ferrite and Granular Bainite is 25% or Less>

The ferrite contained in the metallographic microstructure of the steel sheet is a soft structure and is easily deformed. Therefore, the ferrite contributes to an improvement of elongation. On the other hand, since the ferrite is a soft structure, the ferrite is significantly different from the hard phase in terms of the hardness, and thus becomes a factor in deteriorating the hole expansibility in the steel sheet having a composite microstructure. Similarly to the ferrite, the granular bainite contributes to an improvement of elongation. On the other hand, the granular bainite is harder than ferrite and has intermediate hardness between ferrite and upper bainite or lower bainite. Accordingly, compared with ferrite, the granular bainite has an effect of reducing the hardness difference between the structures in the steel sheet having a composite microstructure.

In a case where the total area ratio of ferrite and granular bainite is less than 10%, sufficient elongation cannot be obtained. In a case where the total area ratio of ferrite and granular bainite is more than 50%, a tensile strength of 980 MPa or more cannot be obtained. In addition, in a case where the area ratio of ferrite with respect to the total area ratio of ferrite and granular bainite (the area ratio of ferrite in the total area ratio of ferrite and granular bainite) is more than 25%, the hardness difference between the structures is increased in the steel sheet having a composite microstructure, and the hole expansibility deteriorates.

That is, in a case where ferrite and granular bainite are contained in an amount of 10% or more and 50% or less in total and the area ratio of ferrite with respect to the total area ratio of ferrite and granular bainite is 25% or less (that is, the area ratio of granular bainite is 75% or more), the elongation and the hole expansibility can be improved at the same time. The area ratio of ferrite may be 0%.

<5% or More of Retained Austenite is Contained>

Retainedaustenite is a metallographic microstructure which is transformed into martensite (strain-induced transformation) during deformation by processing, thereby contributing to an improvement of elongation. In order to obtain predetermined elongation, the area ratio of retained austenite in the steel sheet is set to 5% or more by area ratio. In a case where the area ratio of retained austenite is less than 5%, sufficient elongation cannot be obtained. The higher the area ratio of retained austenite, the better from the viewpoint of an improvement of elongation. However, since it is necessary to increase the content of C or Mn to obtain an area ratio of more than 20% of the retained austenite, the upper limit is substantially 20%.

<One or Both of Upper Bainite and Lower Bainite is Contained in Amount of 10% or More and 50% or Less in Total by Area Ratio>

Upper bainite and lower bainite are metallographic microstructures which have an influence on the formation of retained austenite and are necessary for obtaining a high strength. These structures are commonly called bainite. In a case where the area ratio of upper bainite and/or lower bainite is 10% or more, carbon is concentrated in untransformed austenite when phase transformation from austenite to upper bainite or lower bainite occurs in an annealing process, and it becomes possible to remain 5% or more of untransformed austenite even at room temperature. In a case where the area ratio of upper bainite and/or lower bainite is less than 10%, the strength of the steel sheet becomes insufficient and 5% or more of retained austenite cannot be secured. In a case where the area ratio of upper bainite and/or lower bainite is more than 50%, the phase transformation from austenite to upper bainite or lower bainite is promoted too much. Accordingly, untransformed austenite is reduced, and finally, 5% or more of retained austenite cannot be secured. Therefore, the area ratio of upper bainite and/or lower bainite is set to 50% or less in total.

<Tempered Martensite is Contained in Amount of More than 0% and 30% or Less by Area Ratio>

Tempered martensite contained in the metallographic microstructure of the steel sheet is a metallographic microstructure which has an influence on the formation of retained austenite and is effective for obtaining a high strength. Therefore, the area ratio of tempered martensite is set to more than 0%. The area ratio of tempered martensite is preferably 3% or more, and more preferably 5% or more. On the other hand, since tempered martensite is a hard structure, the tempered martensite is a metallographic microstructure which makes a difference in hardness difference between the structures in the steel sheet having a composite microstructure large, thereby deteriorating hole expansibility. In a case where the area ratio of tempered martensite is more than 30%, the hole expansibility significantly deteriorates. Therefore, the area ratio of tempered martensite is set to 30% or less.

<One or More of Pearlite, Cementite, and Martensite is Contained in Amount of 0 to 10% in Total by Area Ratio>

The cold-rolled steel sheet according to this embodiment may contain one or more of pearlite, cementite, and martensite as a remainder other than the above structures. However, these structures contain a hard iron carbide and become a starting point of void generation during hole expansion. In a case where the sum of area ratios of the above structures is more than 10%, the hole expansibility significantly deteriorates. Therefore, the sum of area ratios is limited to 10% or less. Particularly, martensite is preferably 3% or less in view of the hardness difference between the structures. The smaller the content of the above structures, the more preferable. That is, the sum of area ratios of pearlite, cementite, and martensite may be 0%. The martensite mentioned here is so-called fresh martensite, which is different from tempered martensite.

Identification and calculation of area ratios of ferrite, granular bainite, martensite, upper bainite, lower bainite, retained austenite, pearlite, cementite, and tempered martensite can be performed by performing observation and measurement of a cross-section of the steel sheet in a rolling direction or a cross-section in a direction perpendicular to the rolling direction at a magnification of 1,000 to 50,000 times through structure observation by electron back scattering diffraction (EBSD), X-ray diffraction, and a scanning electron microscope after corrosion using a nital reagent or a lepera liquid.

Specifically, the area ratio of ferrite can be measured by the following method. That is, a range from 1/8 to 3/8 in thickness centered at 1/4 position of the sheet thickness from the surface of the steel sheet is measured at an interval (pitch) of 0.2 μm by EBSD attached to a scanning electron microscope. The value of grain average misorientation is calculated from the measurement data. A region where the value of grain average misorientation is less than 0.5° is defined as ferrite, and the area ratio thereof is measured. Here, the grain average misorientation is a value obtained by calculating orientation difference between adjacent measurement points in a region surrounded by a grain boundary with a crystal orientation difference of 5° or more, and averaging all the calculated values at the measurement points in the crystal grains.

The area ratio of retained austenite can be calculated by measurement using X-rays. That is, a part from a surface to a position 1/4 deep in a sheet thickness direction of a sample is removed by mechanical polishing and chemical polishing. From an integrated intensity ratio of diffraction peaks of (200) and (211) of the bcc phase and (200), (220), and (311) of the fcc phase, obtained using MoKα rays as characteristic X-rays on the sample after polishing, the structure fraction of retained austenite is calculated, and this is defined as the area ratio of retained austenite.

To calculate the area ratio of martensite, a cross-section of the steel sheet in a sheet thickness direction is etched with a lepera liquid, a range from 1/8 to 3/8 in thickness centered at 1/4 position of the sheet thickness from the surface is observed by FE-SEM, and an area ratio of retained austenite measured by X-rays is subtracted from an area ratio of a region where the degree of corrosion is relatively lower than other structures. Otherwise, since martensite is a structure having a high dislocation density and having a substructure such as a block or a packet in the grains, the martensite can be distinguished from other metallographic microstructures according to an electron channeling contrast image obtained using a scanning electron microscope. Therefore, the area ratio of martensite may be obtained from the electron channeling contrast image.

To identify upper bainite, lower bainite, and tempered martensite, a cross-section in a sheet thickness direction is etched with a nital reagent, a range from 1/8 to 3/8 in thickness centered at 1/4 position of the sheet thickness from the surface of the steel sheet (1/8 to 3/8 of the sheet thickness from the surface of the steel sheet) is observed by FE-SEM, and the position and the variant of cementite contained in the structure are observed. Specifically, in upper bainite, cementite or retained austenite is formed at an interface of lath-like bainitic ferrite. In lower bainite, since cementite is formed in lath-like bainitic ferrite and there is one kind of crystal orientation relationship between the bainitic ferrite and the cementite, the formed cementite has the same variant. In tempered martensite, cementite is formed in martensite lath, and since there are two or more crystal orientation relationships between the martensite lath and the cementite, the formed cementite has a plurality of variants. By detecting the characteristics of the cementite, each structure is identified and the area ratio thereof is calculated.

To identify pearlite or cementite, corrosion is performed with a nital reagent, and a range from 1/8 to 3/8 in thickness centered at 1/4 position of the sheet thickness from the surface of the steel sheet is observed using a secondary electron image obtained by a scanning electron microscope. A region imaged brightly in the secondary electron image is defined as pearlite or cementite, and the area ratio thereof is calculated.

Granular bainite is composed of bainitic ferrite which rarely contains hard cementite and has a low dislocation density. Therefore, it cannot be distinguished from ferrite through a conventional corrosion method or secondary electron image observation using a scanning electron microscope. However, the inventors have conducted intensive studies, and as a result, found that since granular bainite is composed of an aggregate of bainitic ferrite, the granular bainite has a minute crystal orientation difference in the grains, and thus can be distinguished from ferrite by detecting the minute crystal orientation difference in the grains. Therefore, the area ratio of granular bainite can be measured by the following method.

That is, a range from ⅛ to ⅜ in thickness centered at ¼ position of the sheet thickness from the surface of the steel sheet is measured at an interval of 0.2 μm using EBSD, and a value of grain average misorientation is calculated from the measurement data. A value obtained by subtracting an area ratio of upper bainite, lower bainite, tempered martensite, pearlite, and martensite from an area ratio of a region where the value of grain average misorientation is 0.5° or more is defined as the area ratio of granular bainite.

The area ratio of each structure is a ratio of the area of each structure to the area of the entire metallographic microstructure.

The cold-rolled steel sheet according to this embodiment has a tensile strength of 980 MPa or more and has a sufficiently high strength. Therefore, in a case where the cold-rolled steel sheet according to this embodiment is applied to a member of a vehicle or the like, the cold-rolled steel sheet contributes to a reduction in weight of the vehicle body or an improvement in safety at the time of collision. There is no need to limit the upper limit of the strength. However, in a case where the strength is more than 1,470 MPa, it is difficult to achieve the strength in a composite microstructure as shown in this embodiment, and it is necessary to form a structure including martensite as a primary phase. Therefore, the upper limit of the strength may be 1,470 MPa.

The cold-rolled steel sheet according to this embodiment may have a hot-dip galvanized layer on the surface. When the hot-dip galvanized layer is formed on the surface, corrosion resistance is improved, which is preferable. The hot-dip galvanized layer preferably contains 1% or more and less than 7% of Fe with a remainder of Zn, Al, and impurities.

The cold-rolled steel sheet according to this embodiment may have an alloyed hot-dip galvannealed layer on the surface. When the alloyed hot-dip galvannealed layer is formed on the surface, corrosion resistance is improved, which is preferable. The alloyed hot-dip galvannealed layer preferably contains 7% or more and 15% or less of Fe with a remainder consisting of Zn, Al, and impurities.

The hot-dip galvanized layer or the alloyed hot-dip galvannealed layer may be formed on one or both surfaces of the steel sheet.

Next, a preferable manufacturing method for obtaining the cold-rolled steel sheet according to this embodiment will be described. As long as the cold-rolled steel sheet according to this embodiment satisfies the above-described chemical component composition and metallographic microstructure, the effects thereof are obtained regardless of the manufacturing method. However, since the cold-rolled steel sheet according to this embodiment can be stably manufactured by a manufacturing method including the following processes (A) to (G), which is preferable.

(A) A cast slab having the same composition as the cold-rolled steel sheet according to this embodiment is maintained after casting such that the temperature thereof is not reduced to a temperature lower than 1,150° C., or is heated to 1,150° C. or higher after being cooled (heating process).

(B) The slab heated to a temperature of 1,150° C. or higher (or maintained to a temperature of 1,150° C. or higher) is subjected to hot rolling, and the hot rolling is completed in a temperature range of an Ar3 transformation point or higher to obtain a hot-rolled steel sheet (hot rolling process).

(C) The hot-rolled steel sheet is coiled in a temperature range of 700° C. or lower (coiling process).

(D) The uncoiled hot-rolled steel sheet is pickled, and then subjected to cold rolling at a cumulative rolling reduction of 30% or more and 80% or less to obtain a cold-rolled steel sheet. (pickling and cold rolling process).

(E) The cold-rolled steel sheet is subjected to continuous annealing in a temperature range of 760° C. or higher and 900° C. or lower (annealing process).

(F) After being subjected to continuous annealing, the cold-rolled steel sheet is cooled to a temperature range of 500° C. to 650° C. at an average cooling rate of 55° C./s or higher and 100° C./s or lower, and is retained in a temperature range of 500° C. to 650° C. for 3 seconds or longer. After being retained, the steel sheet is cooled at an average cooling rate of 10° C./s or higher and 100° C./s or lower, and the cooling is stopped at 180° C. or higher and 400° C. or lower and at Ms or lower (cooling process).

(G) After the cooling process, the cold-rolled steel sheet is reheated to a temperature range of 300° C. or higher and 460° C. or lower, and is held for 15 seconds or longer in the above temperature range (reheating process).

Desirable conditions for each process will be described.

(A) Heating Process

A cast slab having the same composition as the cold-rolled steel sheet according to this embodiment having a tensile strength of 980 MPa or more may contain a large amount of an alloying element. Therefore, it is necessary to solutionize the alloying element in the cast slab before hot rolling. Accordingly, in a case where the cast slab is cooled, the cast slab is preferably heated to 1,150° C. or higher and subjected to hot rolling. In a case where the heating temperature is lower than 1,150° C., a coarse alloy carbide remains, and the deformation resistance during hot rolling increases. Accordingly, the cast slab is heated to 1,150° C. or higher.

However, in a case where the cast slab is subjected to hot rolling without being cooled to a temperature lower than 1,150° C. after casting, heating is not required.

The cast slab to be subjected to hot rolling may be a slab obtained by casting, and is not limited to a specific cast slab. For example, the cast slab may be a continuously cast slab or a slab manufactured by a thin slab caster. As described above, the cast slab is directly subjected to hot rolling, or is cooled, heated, and then subjected to hot rolling.

(B) Hot Rolling Process

The slab of 1,150° C. or higher subjected to the heating process is subjected to hot rolling including rough rolling and finish rolling to obtain a hot-rolled steel sheet. In the hot rolling, the finish rolling temperature (finish rolling completion temperature) is important in view of controlling the structure of the steel sheet. In a case where the finish rolling temperature is in the two-phase temperature range of (austenite+ferrite), there is a concern that the rolling force during hot rolling may increase and cracks may occur during hot rolling. Therefore, the finish rolling temperature is preferably an Ar3 transformation point or more. During hot rolling, roughly rolled sheets may be joined and continuously hot rolled.

Here, the Ar3 transformation point is a temperature at which austenite transformation starts on cooling stage, and is simply calculated using Formula (1) in this embodiment.

$$Ar3=901-325\times C+33\times Si-92\times(Mn+Ni/2+Cr/2+Cu/2+Mo/2) \quad (1)$$

(C) Coiling Process

The hot-rolled steel sheet after the hot rolling process is preferably coiled at a temperature of 700° C. or lower. In a case where the coiling temperature is higher than 700° C., there is a concern that a thick oxide scale may be formed on the surface of the steel sheet and cannot be removed in the pickling process. In this case, the steel sheet is difficult to be subjected to the processes of cold rolling or thereafter. In addition, in a case where the steel sheet is coiled at a temperature higher than 700° C., a carbide in the hot-rolled steel sheet becomes coarse, and is not easily dissolved in the subsequent annealing process. In a case where the carbide dissolution does not proceed during heating in the annealing process, there is a concern that a predetermined strength may not be obtained, or the fraction of ferrite may increase due to insufficient hardenability during the annealing process, and as a result, a structure having a predetermined area ratio may not be obtained. The coiling temperature may be set to 700° C. or lower, and there is no need to particularly determine the lower limit. However, since it is technically difficult to coil the steel sheet at a temperature lower than room temperature, the lower limit is substantially room temperature. The lower the coiling temperature, the more uniform the microstructure of the hot-rolled steel sheet. Accordingly, the mechanical properties after annealing tend to be improved, and the coiling temperature is preferably as low as possible. Meanwhile, the lower the coiling temperature, the higher the strength of the hot-rolled steel sheet and the larger the deformation resistance during cold rolling. Therefore, in a case where the coiling temperature is lowered, tempering for softening may be performed on the hot-rolled steel sheet at about 650° C. using a box annealing furnace or continuous annealing process. In consideration of the strength of the hot-rolled steel sheet and the passability in the line, the coiling is preferably performed at 450° C. or higher and 650° C. or lower.

(D) Pickling and Cold Rolling Process

The coiled hot-rolled steel sheet is uncoiled, pickled, and then subjected to cold rolling. By performing pickling, the oxide scale on the surface of the hot-rolled steel sheet can be removed, and the chemical convertibility and the platability of the cold-rolled steel sheet can be improved. The pickling may be performed once or a plurality of times. In a case where the pickled hot-rolled steel sheet is subjected to cold rolling to obtain a cold-rolled steel sheet, the cumulative rolling reduction in the cold rolling is preferably 30% or more and 80% or less. In a case where the cumulative rolling reduction is less than 30%, it is difficult to keep the shape of the cold-rolled steel sheet flat, and the steel sheet cannot be subjected to the subsequent annealing process. Therefore, the cumulative rolling reduction is preferably 30% or more. The cumulative rolling reduction is more preferably 40% or more. In a case where the cumulative rolling reduction is more than 80%, there is a concern that the rolling force may be excessive, cracks may occur during cold rolling, and it may be difficult to subject the steel sheet to the subsequent annealing process. Therefore, the cumulative rolling reduction is preferably 80% or less. The cumulative rolling reduction is more preferably 70% or less. The number of rolling passes and the rolling reduction for each pass are not particularly limited. The cumulative rolling reduction may be appropriately set so as to be secured within a range of 30% or more and 80% or less.

(E) Annealing Process

The cold-rolled steel sheet is transferred to the continuous annealing line and annealed by being heated to the annealing temperature. In this case, the annealing temperature is preferably 760° C. or higher and 900° C. or lower, and the annealing time is preferably 10 to 600 seconds. In a case where the annealing temperature is lower than 760° C., austenite is not sufficiently formed. In this case, there is a concern that the area ratio of ferrite may increase and a predetermined strength may not be satisfied. In addition, since the area ratio of austenite at the highest heating temperature (annealing temperature) is also reduced, the area ratio of granular bainite, bainite (upper bainite, lower bainite), and tempered martensite, which are transformation structures to be formed during subsequent cooling, is reduced. In this case, there is a concern that carbon necessary for obtaining retained austenite may not be concentrated in austenite, and it may be impossible to secure 5% or more of retained austenite.

In a case where the annealing temperature is higher than 900° C., the grain size of austenite is increased, and the hardenability becomes excessive. In this case, a predetermined area ratio of ferrite and granular bainite is not obtained. Moreover, the transformation from austenite to upper bainite or lower bainite is suppressed. As a result, there is a concern that it may be impossible to secure 5% or more of retained austenite. Therefore, the upper limit of the continuous annealing temperature is preferably 900° C. Continuous annealing may be performed in the air, or may be performed in an oxidation-reduction atmosphere for the purpose of improving plating adhesion.

In addition, in a case where the annealing time is shorter than 10 seconds, there is a concern that the fraction of austenite at the annealing temperature may be insufficient, or the carbide existed before the annealing may not be sufficiently dissolved, and thus a predetermined structure and predetermined characteristics may not be obtained. Even in a case where the annealing time is longer than 600 seconds, there is no problem in characteristics. However, since the line length of the equipment is increased, the upper limit is substantially about 600 seconds.

(F) Cooling Process

After the annealing process, the cold-rolled steel sheet is immediately cooled (for example, within 30 seconds, preferably within 10 seconds) to a temperature range of 500° C. to 650° C. at an average cooling rate of 55° C./s or more and 100° C./s or less. Thereafter, the steel sheet is retained for 3 seconds or longer in a temperature range of 500° C. to 650° C. After being retained, the steel sheet is preferably cooled to 180° C. or higher and 400° C. or lower and a martensitic transformation start temperature (hereinafter, Ms (° C.)) or lower at an average cooling rate of 10° C./s or more and 100° C./s or less.

This process is an effective process for obtaining a predetermined amount of granular bainite. By holding in a predetermined temperature range after phase transformation occurred using a minute amount of dislocations as nuclei, which are included in the austenite grains before transformation, the dislocations at the bainitic ferrite boundary are recovered and granular bainite is formed. Therefore, in order to suppress the excessive formation of ferrite and to obtain a predetermined amount of ferrite and granular bainite, it is necessary to suppress the ferritic transformation to some extent by setting the average cooling rate in a temperature range of 500° C. to 650° C. to 55° C./s or more. Cooling at an average cooling rate of more than 100° C./s is economically disadvantageous in consideration of the capacity of the cooling process in the annealing process. Therefore, the upper limit of the average cooling rate is substantially 100° C./s.

In this cooling process, the steel sheet is preferably retained for 3 seconds or longer in a temperature range of 500° C. to 650° C. By holding the bainitic ferrite formed during cooling on the high temperature side of the bainite formation temperature, the formed bainitic ferrite is recovered, and granular bainite is obtained. That is, it is effective to perform the above-described retention in order to secure the time for dislocation recovery immediately after the formation of bainitic ferrite by cooling at the above-described average cooling rate. In a case where the retention time at 500° C. to 650° C. is shorter than 3 seconds, the bainitic ferrite is not sufficiently recovered, and it is difficult to obtain a predetermined area ratio of granular bainite. In this embodiment, the retention is not limited to isothermal holding, and indicates that the steel sheet temperature is at 500° C. to 650° C. for 3 seconds or longer. No upper limit is set for the retention time, but in a case where the retention time is long, productivity is reduced. Therefore, the retention time may be 600 seconds or shorter.

After the retention, cooling to a temperature range of 180° C. to 400° C. and of Ms or lower at an average cooling rate of 10° C./s or more and 100° C./s or less is performed. In a case where the average cooling rate is 10° C./s or more and the cooling stop temperature is 180° C. to 400° C. and Ms or lower, martensite is formed. The martensite is tempered in the next reheating process and becomes tempered martensite. Therefore, the cooling stop temperature is preferably set to 400° C. or lower and Ms or lower to obtain tempered martensite. In a case where the cooling stop temperature is higher than 400° C. or Ms, martensite is not obtained during cooling, bainite transformation does not sufficiently occur during subsequent reheating, carbon concentration in untransformed austenite does not progress, and a predetermined amount of retained austenite is not obtained. In this case, since the untransformed austenite is transformed into martensite during final cooling, the hole expansibility significantly deteriorates. In a case where the cooling stop temperature is lower than 180° C., there is a concern that the phase transformation from austenite to martensite may be excessively promoted, the amount of martensite formed may exceed 30%, and the hole expansibility may significantly deteriorate.

In this embodiment, the average cooling rate can be calculated by dividing the difference between the cooling start temperature and the cooling stop temperature by the cooling time.

In addition, the Ms varies depending on the area ratio of ferrite and granular bainite formed in the annealing process and the cooling process, and it is difficult to calculate Ms through a calculating formula. However, in a case where the presence of tempered martensite is recognized in the final microstructure, this means that the steel sheet has been cooled to Ms or lower during cooling. Accordingly, Ms can be determined by previously performing a preliminary test or the like on the cooling stop temperature and the area ratio of tempered martensite, and a predetermined area ratio of tempered martensite can be obtained.

(G) Reheating Process

After the cooling is stopped in a temperature range of 180° C. to 400° C. and of Ms or lower, the cold-rolled steel sheet is preferably reheated and held for 15 seconds or longer in a temperature range of 300° C. or higher and 460° C. or lower. According to this process, the carbon diffusion to austenite accompanying the tempering of the martensite formed in the cooling process and the carbon diffusion to austenite due to the progress of the bainite transformation occur. In a case where the holding temperature is lower than 300° C. or the holding time is shorter than 15 seconds, there is a concern that the bainite transformation may not sufficiently progress and the carbon diffusion to austenite may be insufficient. In a case where the holding temperature is higher than 460° C., there is a concern that the transformation from austenite to pearlite may progress, and thus the area ratio of pearlite may be increased or the area ratio of retained austenite is reduced due to instability of the austenite.

After the reheating process, the cold-rolled steel sheet is cooled to room temperature. In this case, it is not necessary to specify the cooling rate, but the cooling rate may be 2° C./s or more and 100° C./s or less.

In the manufacturing of the cold-rolled steel sheet according to this embodiment, the following processes (H) to (J) may be further performed to improve the mechanical properties and the corrosion resistance.

(H) Tempering Process

After the reheating process, reheating of the cold-rolled steel sheet is started after or during cooling to room temperature (Ms or lower), and holding is performed for 2 seconds or longer in a temperature range of 150° C. or higher and 400° C. or lower. According to this process, tempered martensite is formed since the martensite formed during the cooling after the reheating is tempered. Accordingly, the hardness difference between the structures can be further reduced. As a result, it is possible to secure excellent hole expansibility without deteriorating ductility. In a case where the tempering process is performed, and in a case where the holding temperature is lower than 150° C. or the holding time is shorter than 2 seconds, the martensite is not sufficiently tempered, and the microstructure and the mechanical properties are hardly changed. In a case where the holding temperature is higher than 400° C., there is a concern that the dislocation density in the tempered martensite may be reduced, and a tensile strength of 980 MPa or more may not be obtained. Moreover, since cementite precipitates in the untransformed austenite, there is a concern that the austenite may become unstable, the austenite may transform into martensite during cooling, and martensite may be formed after the cooling. Therefore, in a case where tempering is performed, holding is preferably performed for 2 seconds or longer in a temperature range of 150° C. or higher and 400° C. or lower.

The tempering may be performed in continuous annealing process, or may be performed in separate equipment offline after continuous annealing. In this case, the tempering time varies depending on the tempering temperature. That is, the lower the tempering temperature, the longer the tempering time, and the higher the tempering temperature, the shorter the tempering time. In a case where the tempering is performed at a high temperature for a long period of time, the strength is reduced, and it is difficult to obtain a strength of 980 MPa or more. Therefore, the upper limit of the tempering time is preferably set after prior confirmation of the relationship between the tempering temperature and time and the allowance for reduction in strength in the laboratory so as not to acquire a strength below a desired level by the tempering temperature and the components.

(I) Hot-Dip Galvanizing Process

The cold-rolled steel sheet after the reheating process or the tempering process may be optionally heated or cooled to (molten zinc bath temperature−40)° C. to (molten zinc bath temperature+50)° C. so as to be subjected to hot-dip galvanizing. By the hot-dip galvanizing process, a hot-dip galvanized layer is formed on the surface of the cold-rolled steel sheet. This is preferable since the corrosion resistance of the cold-rolled steel sheet is improved. The elongation and the hole expansibility of the cold-rolled steel sheet can be sufficiently maintained even in a case where the hot-dip galvanizing is performed.

(J) Hot-Dip Galvannealing Process

Heat treatment may be performed on the cold-rolled steel sheet having the hot-dip galvanized layer formed thereon in a temperature range of 460° C. or higher and 600° C. or lower as an alloying treatment. In a case where the alloying treatment is performed at a temperature lower than 460° C., the coating layer is not sufficiently alloyed. In a case where the alloying treatment is performed at a temperature higher than 600° C., the alloying excessively proceeds and the corrosion resistance deteriorates. Therefore, in a case where the alloying treatment is performed, the temperature is set to 460° C. or higher and 600° C. or lower.

Electro plating or vapor deposition coating may be performed instead of hot-dip galvanizing. A surface treatment such as organic film formation, film lamination, an organic salt/inorganic salt treatment, or a non-chromium treatment may be applied. The elongation and the hole expansibility of the cold-rolled steel sheet can be sufficiently maintained even in a case where the above-described surface treatment is performed.

EXAMPLES

Next, examples of the present invention will be described. The conditions in the examples are merely a condition example employed to confirm the feasibility and effects of the present invention, although the present invention is not limited to the one condition example. The present invention can employ various conditions as long as the object of the present invention is achieved without departing from the gist of the present invention.

A cast slab having a component composition (chemical composition) shown in Table 1 was directly hot-rolled after casting, or hot-rolled after being cooled and then heated under conditions shown in Tables 2 and 3. Then, coiling was performed. The hot-rolled steel sheet was pickled, and then cold-rolled, annealed, and cooled under conditions shown in Tables 2 and 3. After the cooling, the steel sheet was reheated in an overaging zone under conditions shown in Tables 4 and 5. Some examples were further subjected to tempering, hot-dip galvanizing, and/or an alloying treatment under conditions shown in Tables 4 and 5. In Table 1, a blank indicates that the element was not intentionally added, and the symbol "-" in Tables 4 and 5 indicates that the corresponding process was not performed. The symbol "-" in the column of cooling stop temperature in the reheating process indicates that the cooling was performed to room temperature without being stopped on the way. An underlined value in the tables indicates that the value is out of the range of the present invention.

The metallographic microstructure and the mechanical properties of the steel sheet after annealing, tempering, or hot-dip galvanizing and/or an alloying treatment were examined.

(Metallographic Microstructure)

As a metallographic microstructure, area ratios of ferrite, granular bainite, upper bainite or lower bainite, tempered martensite, retained austenite, and a retained structure (pearlite, martensite, cementite) were observed. Identification and calculation of area ratios of ferrite, granular bainite, tempered martensite, upper bainite, lower bainite, retained austenite, pearlite, cementite, and martensite were performed by performing observation and measurement of a cross-section of the steel sheet in a rolling direction or a cross-section in a direction perpendicular to the rolling direction at a magnification of 1,000 to 50,000 times through structure observation in a range from 1/8 to 3/8 in thickness centered at 1/4 position of the sheet thickness from the surface by electron back scattering diffraction (EBSD), X-ray measurement, corrosion using a nital reagent or a lepera liquid, and a scanning electron microscope as described above. The results are shown in Tables 6 and 7.

(Mechanical Properties)

Tensile strength, total elongation, and hole expansibility were evaluated as mechanical properties. Tensile strength (TS) and total elongation (EL) were measured by collecting a JIS No. 5 test piece in a direction perpendicular to the rolling direction of the steel sheet and by performing a tensile test according to JISZ2242. Hole expansibility ($\lambda$) was evaluated according to the hole expansion test method described in Japanese Industrial Standards JISZ2256. The results are shown in Tables 6 and 7.

TABLE 1

| Steel No. | Chemical Composition/mass % (remainder: Fe and impurities) | | | | | | | | | | | | |
|---|---|---|---|---|---|---|---|---|---|---|---|---|---|
| | C | P | S | N | O | Si | Al | Mn | Cr | Si + Al | Mn + Cr | Mo | Ni |
| A | 0.12 | 0.012 | 0.0042 | 0.0032 | 0.0009 | 1.35 | 0.01 | 2.35 | 0.01 | 1.36 | 2.36 | | |
| B | 0.19 | 0.013 | 0.0033 | 0.0035 | 0.0013 | 1.44 | 0.02 | 2.11 | 0.01 | 1.46 | 2.12 | | |
| C | 0.22 | 0.009 | 0.0041 | 0.0029 | 0.0008 | 1.71 | 0.02 | 2.34 | 0.01 | 1.73 | 2.35 | | |
| D | 0.32 | 0.011 | 0.0034 | 0.0028 | 0.0008 | 1.31 | 0.01 | 2.45 | 0.01 | 1.32 | 2.46 | | |
| E | 0.17 | 0.008 | 0.0028 | 0.0034 | 0.0007 | 1.08 | 0.03 | 2.55 | 0.31 | 1.11 | 2.86 | | |
| F | 0.20 | 0.010 | 0.0037 | 0.0022 | 0.0011 | 1.64 | 0.02 | 2.66 | 0.02 | 1.66 | 2.68 | 0.05 | |
| G | 0.25 | 0.050 | 0.0031 | 0.0025 | 0.0014 | 0.85 | 0.33 | 2.35 | 0.01 | 1.18 | 2.36 | | 0.13 |
| H | 0.16 | 0.008 | 0.0044 | 0.0038 | 0.0010 | 1.44 | 0.03 | 2.44 | 0.21 | 1.47 | 2.65 | | |
| I | 0.18 | 0.009 | 0.0130 | 0.0035 | 0.0010 | 1.22 | 0.03 | 2.33 | 0.01 | 1.25 | 2.34 | | |
| J | 0.19 | 0.011 | 0.0028 | 0.0115 | 0.0010 | 1.46 | 0.02 | 2.22 | 0.01 | 1.48 | 2.23 | | |
| K | 0.23 | 0.009 | 0.0032 | 0.0041 | 0.0077 | 1.41 | 0.02 | 2.35 | 0.01 | 1.43 | 2.36 | | |
| L | 0.19 | 0.012 | 0.0036 | 0.0035 | 0.0010 | 2.30 | 0.22 | 2.66 | 0.02 | 2.52 | 2.68 | | |
| M | 0.21 | 0.011 | 0.0041 | 0.0031 | 0.0010 | 1.23 | 1.35 | 2.44 | 0.02 | 2.58 | 2.46 | | |
| N | 0.19 | 0.009 | 0.0044 | 0.0031 | 0.0008 | 1.44 | 0.03 | 3.78 | 0.01 | 1.47 | 3.79 | | |
| O | 0.18 | 0.008 | 0.0039 | 0.0035 | 0.0015 | 1.22 | 0.05 | 2.15 | 1.50 | 1.27 | 3.65 | 0.04 | |

TABLE 1-continued

| | | | | | | | | | | | | | |
|---|---|---|---|---|---|---|---|---|---|---|---|---|---|
| P | 0.27 | 0.007 | 0.0041 | 0.0032 | 0.0011 | 1.44 | 0.03 | 2.44 | 0.01 | 1.47 | 2.45 | | |
| Q | 0.19 | 0.008 | 0.0032 | 0.0034 | 0.0009 | 1.65 | 0.32 | 2.11 | 0.02 | 1.97 | 2.13 | | 0.03 |
| R | 0.16 | 0.006 | 0.0033 | 0.0052 | 0.0012 | 1.06 | 0.03 | 2.77 | 0.03 | 1.09 | 2.80 | | 0.05 |
| S | 0.21 | 0.008 | 0.0011 | 0.0032 | 0.0008 | 0.99 | 0.44 | 2.55 | 0.22 | 1.43 | 2.77 | 0.03 | |
| T | 0.25 | 0.007 | 0.0022 | 0.0034 | 0.0009 | 1.34 | 0.03 | 1.85 | 0.03 | 1.37 | 1.88 | 0.25 | 0.03 |
| U | 0.22 | 0.009 | 0.0034 | 0.0031 | 0.0011 | 1.55 | 0.04 | 2.11 | 0.31 | 1.59 | 2.42 | 0.05 | |
| V | 0.19 | 0.011 | 0.0035 | 0.0051 | 0.0019 | 0.65 | 0.03 | 2.35 | 0.01 | <u>0.68</u> | 2.36 | | |
| W | 0.21 | 0.013 | 0.0041 | 0.0031 | 0.0015 | 0.04 | 0.61 | 2.20 | 0.03 | <u>0.65</u> | 2.23 | 0.065 | |
| X | 0.19 | 0.009 | 0.0034 | 0.0030 | 0.0011 | 1.34 | 0.03 | 1.34 | 0.02 | 1.37 | <u>1.36</u> | | |
| Y | 0.24 | 0.012 | 0.0034 | 0.0036 | 0.0009 | 1.35 | 0.11 | 1.06 | 0.35 | 1.46 | <u>1.41</u> | | |
| Z | 0.19 | 0.010 | 0.0041 | 0.0056 | 0.0008 | 1.35 | 0.04 | 1.55 | 0.15 | 1.39 | 1.70 | | 0.150 |

| Steel No. | Chemical Composition/mass % (remainder: Fe and impurities) | | | | | | | | $Ar_3$ Transformation Point | Remarks |
|---|---|---|---|---|---|---|---|---|---|---|
| | Cu | Nb | Ti | V | B | Ca | Mg | REM | | |
| A | | | | | | | | | 690 | Comparative Steel |
| B | | | | | | | | | 692 | Invention Steel |
| C | | | | | | | 0.0011 | | 670 | Invention Steel |
| D | | | | | | 0.0023 | | | 614 | Comparative Steel |
| E | | | 0.03 | | 0.0015 | | | | 633 | Invention Steel |
| F | | | 0.02 | | 0.0011 | | | | 642 | Invention Steel |
| G | | | | | | | | | 625 | Comparative Example |
| H | 0.02 | 0.01 | 0.03 | | 0.0022 | | | | 661 | Invention Steel |
| I | | | | | | | | | 668 | Comparative Steel |
| J | | | | 0.02 | | | | | 683 | Comparative Steel |
| K | | | 0.03 | | 0.0023 | | | | 656 | Comparative Steel |
| L | | | 0.03 | | 0.0024 | | | | 670 | Comparative Steel |
| M | | | | | | | | | 648 | Comparative Steel |
| N | | 0.01 | 0.03 | | 0.0021 | | | | 539 | Comparative Steel |
| O | | | | | | | 0.0025 | | 614 | Comparative Steel |
| P | | | | | | | | 0.0021 | 636 | Invention Steel |
| Q | | | | 0.02 | | | | | 697 | Invention Steel |
| R | | | 0.02 | | 0.0016 | | | | 625 | Invention Steel |
| S | | | | 0.02 | 0.0016 | | | | 619 | Invention Steel |
| T | | | 0.02 | | 0.0025 | | | | 680 | Invention Steel |
| U | | | 0.03 | | 0.0022 | | | | 670 | Invention Steel |
| V | | | 0.03 | | 0.0019 | | | | 644 | Comparative Steel |
| W | | 0.01 | 0.02 | | 0.0018 | | | | 627 | Comparative Steel |
| X | | | 0.01 | | 0.0019 | | | | 759 | Comparative Steel |
| Y | | | 0.02 | | 0.0017 | | | | 754 | Comparative Steel |
| Z | | 0.02 | 0.03 | | 0.0021 | | | | 727 | Invention Steel |

TABLE 2

| | | Hot Rolling | | | | Cold Rolling | | |
| --- | --- | --- | --- | --- | --- | --- | --- | --- |
| | | | Finish | | | | | |
| Manufacturing No. | Steel No. | Heating Temperature (° C.) | Rolling Completion Temperature (° C.) | Coiling Temperature (° C.) | Sheet Thickness (mm) | Cold Rolling Ratio (%) | Sheet Thickness (mm) | Annealing Annealing Temperature (° C.) |
| 1 | A | 1230 | 900 | 550 | 3.2 | 56 | 1.4 | 815 |
| 2 | B | 1230 | 900 | 550 | 3.2 | 56 | 1.4 | 809 |
| 3 | C | 1230 | 900 | 550 | 3.2 | 56 | 1.4 | 810 |
| 4 | D | 1230 | 900 | 550 | 3.2 | 56 | 1.4 | 806 |
| 5 | E | 1230 | 900 | 550 | 3.2 | 56 | 1.4 | 805 |
| 6 | F | 1230 | 900 | 550 | 3.2 | 56 | 1.4 | 807 |
| 7 | G | 1230 | 900 | 550 | 3.2 | 56 | 1.4 | 810 |
| 8 | H | 1230 | 900 | 550 | 3.2 | 56 | 1.4 | 806 |
| 9 | I | 1230 | 900 | 550 | 3.2 | 56 | 1.4 | 820 |
| 10 | J | 1230 | 900 | 550 | 3.2 | 56 | 1.4 | 810 |
| 11 | K | 1230 | 900 | 550 | 3.2 | 56 | 1.4 | 815 |
| 12 | L | 1230 | 900 | 550 | 3.2 | 56 | 1.4 | 804 |
| 13 | M | 1230 | 900 | 550 | 3.2 | 56 | 1.4 | 803 |
| 14 | N | 1230 | 900 | 550 | 3.2 | 56 | 1.4 | 809 |
| 15 | O | 1230 | 900 | 550 | 3.2 | 56 | 1.4 | 811 |
| 16 | P | 1230 | 900 | 550 | 3.2 | 56 | 1.4 | 831 |
| 17 | Q | 1230 | 900 | 550 | 3.2 | 56 | 1.4 | 809 |
| 18 | R | 1230 | 900 | 550 | 3.2 | 56 | 1.4 | 810 |
| 19 | S | 1230 | 900 | 550 | 3.2 | 56 | 1.4 | 798 |
| 20 | T | 1230 | 900 | 550 | 3.2 | 56 | 1.4 | 801 |
| 21 | U | 1230 | 900 | 550 | 3.2 | 56 | 1.4 | 795 |
| 22 | V | 1230 | 900 | 550 | 3.2 | 56 | 1.4 | 815 |
| 23 | W | 1230 | 900 | 550 | 3.2 | 56 | 1.4 | 816 |
| 24 | X | 1230 | 900 | 550 | 3.2 | 56 | 1.4 | 814 |
| 25 | Y | 1230 | 900 | 550 | 3.2 | 56 | 1.4 | 813 |
| 26 | Z | 1230 | 900 | 550 | 3.2 | 56 | 1.4 | 809 |
| 38 | B | 1230 | 900 | 550 | 3.2 | 56 | 1.4 | 808 |
| 39 | B | 1230 | 900 | 550 | 3.2 | 56 | 1.4 | 802 |

| Manufacturing No. | Annealing Annealing Time (s) | Cooling Rate to Temperarure Range of 500° C. to 650° C. (° C./s) | Cooling Retention Time at 500° C. to 650° C. (s) | Cooling Rate After Retention (° C./s) | Ms Point Immediately Before Stopping of Cooling (° C.) | Cooling Stop Temperature (° C.) |
| --- | --- | --- | --- | --- | --- | --- |
| 1 | 93 | 87 | 43 | 27 | 275 | 255 |
| 2 | 165 | 82 | 15 | 68 | 356 | 264 |
| 3 | 144 | 73 | 31 | 53 | 333 | 253 |
| 4 | 155 | 82 | 10 | 77 | 323 | 221 |
| 5 | 82 | 59 | 38 | 81 | 348 | 281 |
| 6 | 67 | 77 | 580 | 79 | 350 | 265 |
| 7 | 72 | 62 | 6 | 25 | 334 | 235 |
| 8 | 115 | 82 | 5 | 74 | 357 | 266 |
| 9 | 166 | 86 | 34 | 27 | 368 | 235 |
| 10 | 175 | 60 | 32 | 51 | 367 | 269 |
| 11 | 88 | 80 | 11 | 29 | 322 | 233 |
| 12 | 56 | 95 | 41 | 17 | 273 | 242 |
| 13 | 55 | 85 | 31 | 62 | 291 | 235 |
| 14 | 64 | 90 | 38 | 88 | 328 | 281 |
| 15 | 68 | 92 | 10 | 41 | 379 | 261 |
| 16 | 82 | 61 | 46 | 57 | 332 | 219 |
| 17 | 76 | 60 | 23 | 50 | 368 | 266 |
| 18 | 228 | 69 | 92 | 70 | 352 | 277 |
| 19 | 315 | 64 | 41 | 51 | 349 | 261 |
| 20 | 305 | 67 | 29 | 48 | 361 | 234 |
| 21 | 166 | 80 | 242 | 67 | 357 | 266 |
| 22 | 199 | 73 | 4 | 57 | 341 | 254 |
| 23 | 288 | 82 | 18 | 81 | 348 | 266 |
| 24 | 177 | 87 | 22 | 58 | 370 | 266 |
| 25 | 155 | 94 | 7 | 45 | 365 | 275 |
| 26 | 165 | 88 | 19 | 42 | 375 | 253 |
| 38 | 124 | 79 | 8 | 79 | 350 | 289 |
| 39 | 99 | 73 | 21 | 81 | 344 | 325 |

TABLE 3

| | | Hot Rolling | | | | Cold Rolling | | |
| --- | --- | --- | --- | --- | --- | --- | --- | --- |
| | | | Finish | | | | | |
| Manufacturing No. | Steel No. | Heating Temperature (° C.) | Rolling Completion Temperature (° C.) | Coiling Temperature (° C.) | Sheet Thickness (mm) | Cold Rolling Ratio (%) | Sheet Thickness (mm) | Annealing Annealing Temperature (° C.) |
| 27 | B | 1230 | 900 | 720 | 3.2 | 56 | 1.4 | 815 |
| 28 | B | 1230 | 900 | 550 | 3.2 | 56 | 1.4 | 905 |
| 29 | B | 1230 | 900 | 550 | 3.2 | 56 | 1.4 | 809 |
| 30 | B | 1230 | 900 | 550 | 3.2 | 56 | 1.4 | 816 |
| 31 | B | 1230 | 900 | 550 | 3.2 | 56 | 1.4 | 816 |
| 32 | B | 1230 | 900 | 550 | 3.2 | 56 | 1.4 | 733 |
| 33 | B | 1230 | 900 | 550 | 3.2 | 56 | 1.4 | 795 |
| 34 | B | 1230 | 900 | 550 | 3.2 | 56 | 1.4 | 799 |
| 35 | B | 1230 | 900 | 550 | 3.2 | 56 | 1.4 | 811 |
| 36 | B | 1230 | 900 | 550 | 3.2 | 56 | 1.4 | 813 |
| 37 | B | 1230 | 900 | 550 | 3.2 | 56 | 1.4 | 809 |
| 40 | B | 1230 | 900 | 550 | 3.2 | 56 | 1.4 | 813 |
| 41 | B | 1230 | 900 | 550 | 3.2 | 56 | 1.4 | 821 |
| 42 | B | 1230 | 900 | 550 | 3.2 | 56 | 1.4 | 882 |
| 43 | B | 1230 | 900 | 550 | 3.2 | 56 | 1.4 | 815 |

| | | | Cooling | | | |
| --- | --- | --- | --- | --- | --- | --- |
| Manufacturing No. | Annealing Annealing Time (S) | Cooling Rate to Temperature Range of 500° C. to 650° C. (° C./s) | Retention Time at 500° C. to 650° C. (s) | Cooling Rate After Retention (° C./s) | Ms Point Immediately Before Stopping of Cooling (° C.) | Cooling Stop Temperature (° C.) |
| 27 | 211 | 97 | 29 | 75 | 358 | 266 |
| 28 | 166 | 85 | 37 | 23 | 384 | 247 |
| 29 | 155 | 83 | 44 | 61 | 357 | 156 |
| 30 | 157 | 83 | 42 | 62 | 362 | 219 |
| 31 | 134 | 70 | 41 | 29 | 360 | 225 |
| 32 | 144 | 59 | 17 | 59 | 290 | 255 |
| 33 | 146 | 73 | 19 | 53 | 354 | 277 |
| 34 | 366 | 59 | 16 | 61 | 356 | 275 |
| 35 | 377 | 97 | 38 | 64 | 360 | 211 |
| 36 | 9 | 65 | 18 | 91 | 359 | 254 |
| 37 | 92 | 80 | 40 | 46 | 353 | 416 |
| 40 | 306 | 90 | 2 | 19 | 351 | 245 |
| 41 | 423 | 46 | 3 | 33 | 361 | 226 |
| 42 | 262 | 52 | 17 | 28 | 377 | 322 |
| 43 | 373 | 82 | 24 | 8 | 352 | 247 |

TABLE 4

| | Reheating | | | | Tempering | | Plating | | | |
| --- | --- | --- | --- | --- | --- | --- | --- | --- | --- | --- |
| | Overaging | | Ms Point at Time of Completion of Holding in Overaging Zone (° C.) | Cooling | | | | | | |
| Manufacturing No. | Zone Temperature (° C.) | Holding Time (s) | | Stop Temperature (° C.) | Tempering Temperature (° C.) | Tempering Time (s) | Presence/ Absence | Plating Temperature (° C.) | Heating Temperature (° C.) | Alloying Temperature (° C.) |
| 1 | 355 | 412 | — | — | — | — | Absence | — | — | — |
| 2 | 389 | 244 | — | — | — | — | Absence | — | — | — |
| 3 | 395 | 132 | — | — | — | — | Absence | — | — | — |
| 4 | 367 | 67 | — | — | — | — | Absence | — | — | — |
| 5 | 367 | 108 | — | — | — | — | Absence | — | — | — |
| 6 | 395 | 110 | — | — | — | — | Absence | — | — | — |
| 7 | 377 | 241 | — | — | — | — | Absence | — | — | — |
| 8 | 371 | 254 | — | — | — | — | Absence | — | — | — |
| 9 | 365 | 344 | — | — | — | — | Absence | — | — | — |
| 10 | 346 | 108 | — | — | — | — | Absence | — | — | — |
| 11 | 368 | 191 | — | — | — | — | Absence | — | — | — |
| 12 | 399 | 79 | — | — | — | — | Absence | — | — | — |
| 13 | 366 | 201 | — | — | — | — | Absence | — | — | — |
| 14 | 371 | 119 | — | — | — | — | Absence | — | — | — |

TABLE 4-continued

| | Overaging | | Reheating Ms Point at Time of Completion of Holding in Overaging | Cooling Stop | Tempering | | Plating | | | |
|---|---|---|---|---|---|---|---|---|---|---|
| Manufacturing No. | Zone Temperature (° C.) | Holding Time (s) | Zone (° C.) | Temperature (° C.) | Tempering Temperature (° C.) | Tempering Time (s) | Presence/ Absence | Plating Temperature (° C.) | Heating Temperature (° C.) | Alloying Temperature (° C.) |
| 15 | 355 | 131 | — | — | — | — | Absence | — | — | — |
| 16 | 344 | 175 | — | — | — | — | Absence | — | — | — |
| 17 | 377 | 121 | — | — | — | — | Absence | — | — | — |
| 18 | 381 | 233 | — | — | — | — | Absence | — | — | — |
| 19 | 395 | 143 | — | — | — | — | Absence | — | — | — |
| 20 | 406 | 119 | — | — | — | — | Absence | — | — | — |
| 21 | 400 | 76 | — | — | — | — | Absence | — | — | — |
| 22 | 382 | 88 | — | — | — | — | Absence | — | — | — |
| 23 | 375 | 223 | — | — | — | — | Absence | — | — | — |
| 24 | 401 | 220 | — | — | — | — | Absence | — | — | — |
| 25 | 388 | 195 | — | — | — | — | Absence | — | — | — |
| 26 | 385 | 205 | — | — | — | — | Absence | — | — | — |
| 38 | 433 | 278 | — | — | — | — | Presence | 462 | 458 | — |
| 39 | 301 | 103 | — | — | — | — | Presence | 454 | 469 | 478 |

TABLE 5

| | Overaging | | Reheating Ms Point at Time of Completion of Holding in Overaging | Cooling Stop | Tempering | | Plating | | | |
|---|---|---|---|---|---|---|---|---|---|---|
| Manufacturing No. | Zone Temperature (° C.) | Holding Time (s) | Zone (° C.) | Temperature (° C.) | Tempering Temperature (° C.) | Tempering Time (s) | Presence/ Absence | Plating Temperature (° C.) | Heating Temperature (° C.) | Alloying Temperature (° C.) |
| 27 | 377 | 68 | — | — | — | — | Absence | — | — | — |
| 28 | 366 | 223 | — | — | — | — | Absence | — | — | — |
| 29 | 346 | 306 | — | — | — | — | Absence | — | — | — |
| 30 | 264 | 309 | — | — | — | — | Absence | — | — | — |
| 31 | 493 | 68 | — | — | — | — | Absence | — | — | — |
| 32 | 376 | 91 | — | — | — | — | Absence | — | — | — |
| 33 | 366 | 10 | — | — | — | — | Absence | — | — | — |
| 34 | 355 | 194 | — | — | — | — | Absence | — | — | — |
| 35 | 366 | 235 | 193 | 43 | 419 | 30 | Presence | 466 | 460 | 488 |
| 36 | 345 | 255 | — | — | — | — | Absence | — | — | — |
| 37 | 377 | 124 | — | — | — | — | Absence | — | — | — |
| 40 | 429 | 115 | — | — | — | — | Absence | — | — | — |
| 41 | 329 | 92 | — | — | — | — | Absence | — | — | — |
| 42 | 433 | 342 | — | — | — | — | Absence | — | — | — |
| 45 | 333 | 31 | — | — | — | — | Absence | — | — | — |

TABLE 6

| | | Metallographic microstructure | | | | |
|---|---|---|---|---|---|---|
| Manufacturing No. | Steel No. | Sum of Area Ratios of Ferrite and Granular Bainite (%) | Ratio of Ferrite in Total Area Fraction of Ferrite and Granular Bainite | Ratio of Granular Bainite in Total Area Fraction of Ferrite and Granular Bainite | Sum of Area Ratios of Upper Bainite and Lower Bainite (%) | Area Ratio of Tempered Martensite (%) |
| 1 | A | <u>65</u> | <u>65</u> | <u>35</u> | 15 | 5 |
| 2 | B | 35 | 18 | 82 | 39 | 12 |
| 3 | C | 35 | 13 | 87 | 38 | 9 |
| 4 | D | <u>9</u> | <u>60</u> | <u>40</u> | 36 | 21 |
| 5 | E | 31 | 23 | 77 | 41 | 13 |
| 6 | F | 19 | 21 | 79 | 32 | 28 |

TABLE 6-continued

| | | | | | | |
|---|---|---|---|---|---|---|
| 7 | G | 25 | 19 | 81 | 33 | 19 |
| 8 | H | 31 | 21 | 79 | 31 | 23 |
| 9 | I | 22 | 21 | 79 | 41 | 22 |
| 10 | J | 23 | 24 | 76 | 35 | 23 |
| 11 | K | 39 | 9 | 91 | 38 | 11 |
| 12 | L | <u>55</u> | <u>38</u> | <u>62</u> | 29 | 6 |
| 13 | M | <u>52</u> | <u>44</u> | <u>56</u> | 21 | 5 |
| 14 | N | <u>9</u> | 9 | 91 | 22 | 9 |
| 15 | O | <u>8</u> | 7 | 93 | 21 | 21 |
| 16 | P | 19 | 9 | 91 | 35 | 26 |
| 17 | Q | 25 | 13 | 87 | 36 | 24 |
| 18 | R | 25 | 12 | 88 | 33 | 26 |
| 19 | S | 19 | 21 | 79 | 45 | 21 |
| 20 | T | 18 | 22 | 78 | 43 | 23 |
| 21 | U | 23 | 9 | 91 | 40 | 27 |
| 22 | V | 37 | <u>35</u> | <u>65</u> | 32 | 25 |
| 23 | W | 32 | <u>33</u> | <u>67</u> | 36 | 22 |
| 24 | X | <u>52</u> | <u>65</u> | <u>35</u> | 21 | 13 |
| 25 | Y | 53 | <u>69</u> | <u>31</u> | 19 | 9 |
| 26 | Z | 38 | 16 | 84 | 35 | 13 |
| 38 | B | 33 | 20 | 80 | 41 | 11 |
| 39 | B | 37 | 11 | 89 | 35 | 13 |

| | Metallographic microstructure | | Mechanical Properties | | | |
|---|---|---|---|---|---|---|
| Manufacturing No. | Area Ratio of Retained Austenite (%) | Area Ratio of Remainder (%) | TS (MPa) | TS × EL (MPa · %) | TS × λ (MPa · %) | Remarks |
| 1 | <u>2</u> | <u>13</u> | 1011 | 11121 | 17187 | Comparative Example |
| 2 | 11 | 3 | 1015 | 21315 | 23345 | Example |
| 3 | 12 | 6 | 1032 | 24768 | 26832 | Example |
| 4 | 16 | <u>18</u> | 1410 | 26790 | 2820 | Comparative Example |
| 5 | 7 | 8 | 1020 | 13260 | 23460 | Example |
| 6 | 12 | 9 | 1195 | 19120 | 38240 | Example |
| 7 | 13 | 10 | 1051 | 23122 | 13663 | Comparative Example |
| 8 | 9 | 6 | 991 | 20811 | 22793 | Example |
| 9 | 9 | 6 | 985 | 18715 | 12805 | Comparative Example |
| 10 | 11 | 8 | 998 | 18962 | 15968 | Comparative Example |
| 11 | 8 | 4 | 1035 | 18630 | 13455 | Comparative Example |
| 12 | 9 | <u>1</u> | 981 | 15696 | 15696 | Comparative Example |
| 13 | 8 | <u>14</u> | <u>971</u> | 17478 | 11652 | Comparative Example |
| 14 | 5 | <u>55</u> | 1235 | 11115 | 13585 | Comparative Example |
| 15 | 6 | <u>44</u> | 1246 | 9968 | 16198 | Comparative Example |
| 16 | 19 | 1 | 1316 | 17108 | 32900 | Example |
| 17 | 9 | 6 | 985 | 22655 | 28565 | Example |
| 18 | 13 | 3 | 1191 | 17865 | 38112 | Example |
| 19 | 13 | 2 | 1193 | 19088 | 46527 | Example |
| 20 | 13 | 3 | 1183 | 16562 | 18928 | Example |
| 21 | 10 | 0 | 1199 | 14388 | 35970 | Example |
| 22 | <u>4</u> | 2 | 1033 | 9297 | 13429 | Comparative Example |
| 23 | <u>3</u> | 7 | 1025 | 10250 | 16400 | Comparative Example |
| 24 | <u>3</u> | <u>11</u> | 996 | 13944 | 12948 | Comparative Example |
| 25 | <u>3</u> | <u>16</u> | 1186 | 11860 | 35580 | Comparative Example |
| 26 | 12 | 2 | 1011 | 29319 | 31341 | Example |
| 38 | 11 | 4 | 1009 | 21953 | 31572 | Example |
| 39 | 14 | 1 | 1017 | 22781 | 26243 | Example |

TABLE 7

| Manufacturing No. | Steel No. | Sum of Area Ratios of Ferrite and Granular Bainite (%) | Ratio of Ferrite in Total Area Fraction of Ferrite and Granular Bainite (%) | Ratio of Granular Bainite in Total Area Fraction of Ferrite and Granular Bainite (%) | Sum of Area Ratios of Upper Bainite and Lower Bainite (%) | Area Ratio of Tempered Martensite (%) |
|---|---|---|---|---|---|---|
| 27 | B | <u>52</u> | 66 | <u>34</u> | 24 | 8 |
| 28 | B | <u>9</u> | 7 | 93 | 35 | <u>51</u> |
| 29 | B | 34 | 21 | 79 | 29 | <u>32</u> |
| 30 | B | 31 | 19 | 81 | 15 | 29 |
| 31 | B | 32 | 11 | 89 | 22 | 16 |
| 32 | B | <u>55</u> | <u>90</u> | <u>10</u> | 13 | 6 |
| 33 | B | 36 | 12 | 88 | 2 | 19 |
| 34 | B | <u>56</u> | <u>71</u> | <u>29</u> | 21 | 5 |
| 35 | B | 32 | 16 | 84 | 33 | 19 |
| 36 | B | 33 | 15 | 85 | 36 | 12 |
| 37 | B | 37 | 16 | 84 | 17 | 3 |
| 40 | B | <u>62</u> | <u>88</u> | <u>12</u> | 10 | 16 |
| 41 | B | <u>56</u> | <u>73</u> | <u>27</u> | 14 | 14 |
| 42 | B | 48 | <u>27</u> | <u>73</u> | 28 | 13 |
| 45 | B | 30 | 14 | 86 | <u>51</u> | 11 |

| Manufacturing No. | Area Ratio of Retained Austenite (%) | Area Ratio of Remainder (%) | TS (MPa) | TS × EL (MPa · %) | TS × λ (MPa · %) | Remarks |
|---|---|---|---|---|---|---|
| 27 | <u>3</u> | <u>13</u> | 981 | 11772 | 17658 | Comparative Example |
| 28 | <u>3</u> | 2 | 1051 | 8408 | 45193 | Comparative Example |
| 29 | 3 | 2 | 1035 | 9315 | 45540 | Comparative Example |
| 30 | 4 | 21 | 1044 | 11484 | 19836 | Comparative Example |
| 31 | <u>0</u> | 30 | 1023 | 13299 | 16368 | Comparative Example |
| 32 | <u>0</u> | 26 | <u>924</u> | 17556 | 30492 | Comparative Example |
| 33 | 4 | 32 | 1044 | 16704 | 15660 | Comparative Example |
| 34 | 3 | 15 | <u>944</u> | 16048 | 15104 | Comparative Example |
| 35 | 4 | 12 | 988 | 11856 | 25688 | Comparative Example |
| 36 | 4 | 15 | <u>934</u> | 13076 | 31756 | Comparative Example |
| 37 | 4 | 39 | 1035 | 11385 | 15525 | Comparative Example |
| 40 | 11 | 1 | <u>917</u> | 19181 | 25100 | Comparative Example |
| 41 | 12 | 4 | <u>922</u> | 19123 | 22174 | Comparative Example |
| 42 | 4 | 7 | 994 | 11275 | 17238 | Comparative Example |
| 45 | 7 | 1 | <u>891</u> | 9815 | 34144 | Comparative Example |

As can be seen from Tables 1 to 7, it was found that all the examples in which the chemical composition and the metallographic microstructure are within the range of the present invention have a high strength of 980 MPa or more, have a high value in TS×EL and TS×λ, and are excellent in elongation and hole expansibility, but the comparative examples in which the chemical composition and the metallographic microstructure are out of the range of the present invention have a low strength, have a low value in TS×EL and TS×λ, and are poor in elongation and/or hole expansibility.

INDUSTRIAL APPLICABILITY

According to the present invention, it is possible to provide a high-strength cold-rolled steel sheet which is suitable as a structural member of a vehicle or the like, is excellent in elongation and hole expansibility, and has a tensile strength of 980 MPa or more. In a case where the cold-rolled steel sheet of the present invention is applied to a vehicle or the like, the cold-rolled steel sheet contributes to a reduction in weight of the vehicle body or an improvement in safety at the time of collision. Accordingly, the present invention has high industrial applicability.

The invention claimed is:

1. A high-strength cold-rolled steel sheet comprising, as a chemical composition, by mass %:
    C: 0.15% or more and 0.30% or less;
    P: 0.040% or less;
    S: 0.0100% or less;
    N: 0.0100% or less;
    O: 0.0060% or less;
    one or both of Si and Al: 0.70% or more and 2.50% or less in total;
    one or both of Mn and Cr: 1.50% or more and 3.50% or less in total;
    Mo: 0% or more and 1.00% or less;
    Ni: 0% or more and 1.00% or less;
    Cu: 0% or more and 1.00% or less;
    Nb: 0% or more and 0.30% or less;
    Ti: 0% or more and 0.30% or less;
    V: 0% or more and 0.30% or less;
    B: 0% or more and 0.0050% or less;
    Ca: 0% or more and 0.0400% or less;
    Mg: 0% or more and 0.0400% or less;
    REM: 0% or more and 0.0400% or less; and
    a remainder of Fe and impurities
    wherein a metallographic microstructure of the steel sheet contains, by area ratio,
        one or both of ferrite and granular bainite: 10% or more and 50% or less in total,
        one or both of upper bainite and lower bainite: 10% or more and 50% or less in total,
        tempered martensite: more than 0% and 30% or less,
        retained austenite: 5% or more, and
        one or more of pearlite, cementite, and martensite: 0% to 10% in total,
    an area ratio of the ferrite with respect to a total area ratio of the ferrite and the granular bainite is 25% or less, if the area ratio is determined from a cross-section of the steel sheet in a rolling direction or a cross-section in a direction perpendicular to the rolling direction at a magnification of 1,000 to 50,000 times and the structure is observed by electron back scattering diffraction (EBSD), X-ray diffraction, and a scanning electron microscope after corrosion using a nital reagent or a lepera liquid, and
    the steel sheet has a tensile strength of 980 MPa or more, when the tensile strength is measured by collecting a test piece in a direction perpendicular to the rolling direction of the steel sheet and by performing a tensile test according to Japanese Industrial Standards JISZ2242.

2. The high-strength cold-rolled steel sheet according to claim 1,
    wherein the martensite is contained in an amount of 3% or less by area ratio in the metallographic microstructure.

3. The high-strength cold-rolled steel sheet according to claim 1,
    wherein the chemical composition contains, by mass %, one or more selected from
    Mo: 0.01% or more and 1.00% or less,
    Ni: 0.05% or more and 1.00% or less,
    Cu: 0.05% or more and 1.00% or less,
    Nb: 0.005% or more and 0.30% or less,
    Ti: 0.005% or more and 0.30% or less,
    V: 0.005% or more and 0.30% or less,
    B: 0.0001% or more and 0.0050% or less,
    Ca: 0.0005% or more and 0.0400% or less,
    Mg: 0.0005% or more and 0.0400% or less, and
    REM: 0.0005% or more and 0.0400% or less.

4. The high-strength cold-rolled steel sheet according to claim 1, wherein
    a hot-dip galvanized layer is formed on a surface of the steel sheet.

5. The high-strength cold-rolled steel sheet according to claim 1, wherein
    an alloyed hot-dip galvannealed layer is formed on a surface of the steel sheet.

6. The high-strength cold-rolled steel sheet according to claim 2,
    wherein the chemical composition contains, by mass %, one or more selected from
    Mo: 0.01% or more and 1.00% or less,
    Ni: 0.05% or more and 1.00% or less,
    Cu: 0.05% or more and 1.00% or less,
    Nb: 0.005% or more and 0.30% or less,
    Ti: 0.005% or more and 0.30% or less,
    V: 0.005% or more and 0.30% or less,
    B: 0.0001% or more and 0.0050% or less,
    Ca: 0.0005% or more and 0.0400% or less,
    Mg: 0.0005% or more and 0.0400% or less, and
    REM: 0.0005% or more and 0.0400% or less.

7. The high-strength cold-rolled steel sheet according to claim 2, wherein
    a hot-dip galvanized layer is formed on a surface of the steel sheet.

8. The high-strength cold-rolled steel sheet according to claim 3, wherein
    a hot-dip galvanized layer is formed on a surface of the steel sheet.

9. The high-strength cold-rolled steel sheet according to claim 6, wherein
    a hot-dip galvanized layer is formed on a surface of the steel sheet.

10. The high-strength cold-rolled steel sheet according to claim 2, wherein
    an alloyed hot-dip galvannealed layer is formed on a surface of the steel sheet.

11. The high-strength cold-rolled steel sheet according to claim 3, wherein
    an alloyed hot-dip galvannealed layer is formed on a surface of the steel sheet.

12. The high-strength cold-rolled steel sheet according to claim 6, wherein
    an alloyed hot-dip galvannealed layer is formed on a surface of the steel sheet.

* * * * *